US012809749B2

(12) United States Patent
Chandramohan

(10) Patent No.: US 12,809,749 B2
(45) Date of Patent: Nov. 24, 2026

(54) BINARY DETECTION IN SOFTWARE

(71) Applicant: Oracle International Corporation, Redwood Shores, CA (US)

(72) Inventor: Mahinthan Chandramohan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 330 days.

(21) Appl. No.: 18/476,608

(22) Filed: Sep. 28, 2023

(65) Prior Publication Data

US 2025/0110854 A1 Apr. 3, 2025

(51) Int. Cl.
*G06F 11/362* (2025.01)
*G06F 8/75* (2018.01)

(52) U.S. Cl.
CPC ............ *G06F 11/3636* (2013.01); *G06F 8/75* (2013.01)

(58) Field of Classification Search
None
See application file for complete search history.

(56) References Cited

U.S. PATENT DOCUMENTS

2020/0218535 A1* 7/2020 Alomari .............. G06F 16/9027
2020/0394028 A1* 12/2020 Byrne ................. G06F 9/45558
2021/0374229 A1* 12/2021 Kumar .................. G06F 21/563
2022/0244953 A1* 8/2022 Ji ........................... G06N 3/084
2023/0176838 A1* 6/2023 Bronevetsky ............. G06F 8/71 717/110
2023/0185568 A1* 6/2023 Wu ......................... G06F 8/433 717/123

OTHER PUBLICATIONS

F.E. Allen "Control Flow Analysis", ACM Sigplan Notices, Jul. 1, 1970, 19 pages.
R. Duan, et al., "Identifying Open-Source License Violation and 1-day Security Risk at Large Scale", in Proceedings of the 2017 ACM SIGSAC Conference on Computer and Communications Security, Oct. 30, 2017, 17 pages.
Z. Feng, et al., "CodeBERT: A Pre-Trained Model for Programming and Natural Languages", arViv Preprint arXiv, Sep. 18, 2020, 12 pages.

(Continued)

*Primary Examiner* — Lewis A Bullock, Jr.
*Assistant Examiner* — Mark A Gooray
(74) *Attorney, Agent, or Firm* — Lathrop GPM LLP

(57) ABSTRACT

A method includes disassembling a reference binary of a library to generate a control flow graph of the referenced binary, normalizing the control flow graph to generate a normalized graph, traversing the normalized graph to generate execution traces from the normalized graph, and generating library vector embeddings. Generating library vector embeddings includes, for each execution trace of at least a subset of the execution traces, processing the execution trace by a vector embedding model to generate a library vector embedding of the execution trace. The method further includes relating, in storage, a library identifier of the library to the plurality of library vector embeddings as a fingerprint of the library.

20 Claims, 11 Drawing Sheets

(56) References Cited

OTHER PUBLICATIONS

W. Tang, et al., "LibDB: An Effective and Efficient Framework for Detecting Third-Party Libraries in Binaries", in Proceedings of the 19th International Conference on Mining Software Repositories, Apr. 21, 2022, 12 pages.
R. Tarjan, "Depth-first Search and Linear Graph Algorithms", SIAM Journal on Computing, Jan. 1, 1972, 8 pages.
F. Wang, et al., "Angr-the Generation of Binary Analysis", in 2017 IEEE Cybersecurity Development (SecDev), Jul. 1, 2017, 2 pages.
C. Yang, et al., "Modx: Binary Level Partially Imported Third-Party Library Detection via Program Modularization and Semantic Matching", in Proceedings of the 44th International Conference on Software Engineering, Apr. 18, 2022, 13 pages.

* cited by examiner

BINARY DETECTION IN SOFTWARE

BACKGROUND

Software development often includes developers writing new source code in a high level programming language that uses software libraries. Software libraries may in turn use native libraries that perform specific operations. The native libraries compile into a native binary, which is a precompiled code that is compiled for the hardware platform on which the native binary will execute. Native binaries are often written in a lower level programming language, such as C or C++ and are used by libraries.

By way of an example, consider a programmer that writes a gaming web application which uses one or more software libraries. The software library is written in Python programming language. The gaming application interacts with users, processes the interactions, and provides visual output. One aspect of the gaming application rendering to provide the visual output. Because the library and the gaming application are written in a higher level programming language, the library or the application would be slow and inefficient in performing the rendering. Thus, a native binary may be used that performs the rendering. Namely, the application with the library gets the user input, pass the result of the input to the binary, and the binary communicates with the graphics processing unit (GPU) to render the output.

Thousands of libraries exist which use native libraries, and, correspondingly, native binaries. For example, the Elasticsearch library has forty six native binaries in it. Native binaries may have vulnerabilities. Because of the number of libraries and native binaries, a difficulty exists in tracking the native binaries that are used in an application.

For large software projects, many software libraries and software library versions may be used in a single software project. Further, after software libraries are released and used on software projects, vulnerabilities may be discovered in the software libraries and the native binaries used in the software libraries. For example, vulnerabilities may be discovered months or even years after users have integrated the software libraries and corresponding native binaries into their software projects. A vulnerability is a weakness in the software that may allow an unauthorized user or code to attack software. Thus, malicious code and users may perform denial of service attacks, install malware, access sensitive data, or perform other nefarious actions by exploiting the vulnerability.

SUMMARY

In general, in one aspect, one or more embodiments relate to a method that includes disassembling a reference binary of a library to generate a control flow graph of the referenced binary, normalizing the control flow graph to generate a normalized graph, traversing the normalized graph to generate execution traces from the normalized graph, and generating library vector embeddings. Generating library vector embeddings includes, for each execution trace of at least a subset of the execution traces, processing the execution trace by a vector embedding model to generate a library vector embedding of the execution trace. The method further includes relating, in storage, a library identifier of the library to the plurality of library vector embeddings as a fingerprint of the library.

In general, in one aspect, one or more embodiments relate to a system that includes storage and a computer processor comprising computer readable program code for causing a computing system to perform operations. The operations include disassembling a reference binary of a library to generate a control flow graph of the referenced binary, normalizing the control flow graph to generate a normalized graph, traversing the normalized graph to generate execution traces from the normalized graph, and generating library vector embeddings. Generating library vector embeddings includes, for each execution trace of at least a subset of the execution traces, processing the execution trace by a vector embedding model to generate a library vector embedding of the execution trace. The operations further include relating, in storage, a library identifier of the library to the plurality of library vector embeddings as a fingerprint of the library.

In general, in one aspect, one or more embodiments relate to a method that includes disassembling target software to generate a control flow graph, normalizing the control flow graph to generate a normalized graph, traversing the normalized graph to generate execution traces from the normalized graph, and processing the execution traces to generate target vector embeddings of the target software. The method further includes selecting, from multiple libraries, a library in which the target vector embeddings match a threshold of a library fingerprint of the library to obtain a selected library and processing the target software based on the selected library.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to detecting native binaries in software libraries. Specifically, one or more embodiments generate fingerprints that are vector embeddings from execution traces of a binary of a native library. The set of vector embeddings form a fingerprint of the native library. Specifically, a binary is decomposed into a control flow graph, which is then normalized. The normalization removes hardware specific portions of the control flow graph. The normalized graph is traversed to obtain execution traces for the binary. At least a subset of the execution traces are processed through a specifically trained vector embedding model to generate library vector embeddings. The specifically trained vector embedding model is trained on assembly language. Each library vector embedding is a vector embedding of a corresponding execution trace. Thus, the collection of execution traces form the fingerprint for a library.

When target software is being analyzed, the binary of the target software undergoes a similar process to identify execution traces and corresponding vector embeddings therefrom of the target software. A matching process is then performed to determine whether the vector embeddings generated from the target software satisfy a threshold of matching vector embeddings in the binary of the native library. If the threshold is satisfied, then the native library is detected as being in the target software. Accordingly, the target software may be updated to address the vulnerability.

Notably, large target software can use a number of libraries. The libraries often have large codebases and may, in turn, rely on several native binaries. Developers writing target software using libraries may be unaware when writing the target software of the various native binaries used by the libraries. Thus, when vulnerabilities are discovered in the native binaries, the target software becomes vulnerable. On the vulnerability side, large data repositories store vulnerability listings time and space independent of the repositories having the libraries and target software. Thus, when the native binaries generated from libraries that are used by high level libraries and ultimately used by target software are unknown, identifying vulnerabilities in the target software due to the native binaries is a technical challenge.

Figure 1:
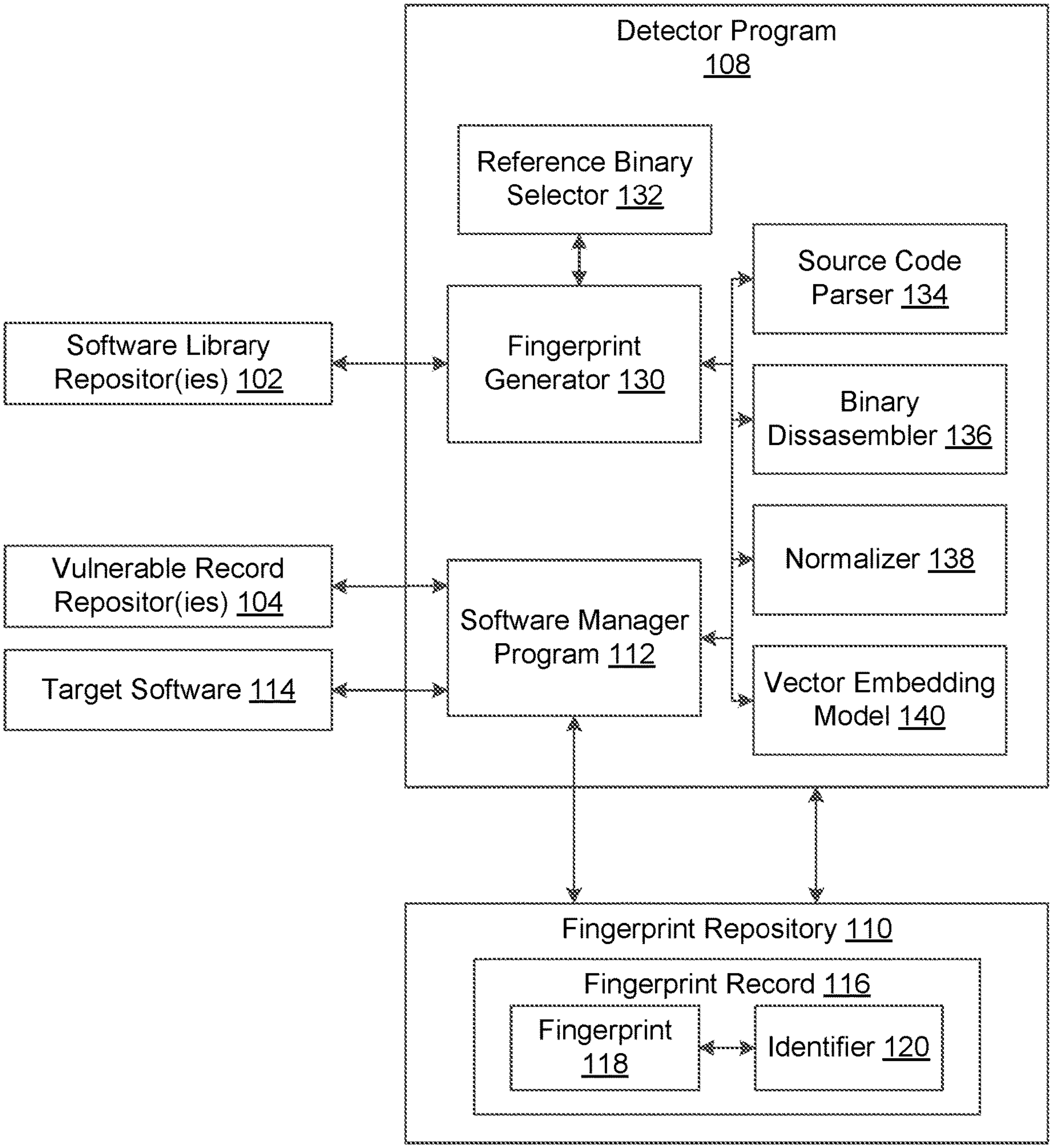
FIG. 1 shows a diagram of a system in accordance with one or more embodiments.

Turning to the Figures, FIG. 1 shows a diagram of a system in accordance with one or more embodiments. As shown in FIG. 1, the system includes a detector program (108) connected to one or more software library repositories (102), one or more vulnerable record repositories (104), and a fingerprint repository (110). Each of these components is described below.

The various repositories shown in FIG. 1 are data repositories. A data repository is any type of storage unit and/or device (e.g., a file system, database, data structure, or any other storage mechanism) for storing data. Further, the data repository may include multiple different, potentially heterogeneous, storage units and/or devices. One or more of the data repositories may be third party repositories. Further, the data in the data repository may be third party data, such as data available for public use or purchase.

Software library repositor(ies) (102) are one or more repositories having at least one software library. A software library is a set of instructions that may be incorporated into other software (e.g., target software (114), another software library). Software library may be composed of a set of code files. A code file is a file having software code. The software code in the code file may be source code and/or executable code. The set of code files may be distributed across different repositories. For example, one software library repository may store source code and another software library may store the executable code. The executable code is a compiled version of the source code. For example, the executable code may be any compiled code or other executable form of software. Within the software code are code sections. A code section is stored in a single code file, whereby the single code file may have one or more code sections. A code section is a compilation unit or other block of code. A code section may be a method or class. Although the terms method and class are used, the term method and class refer to equivalent units of code in other programming languages. For example, a class is any programming language structure that encapsulates code. The code encapsulated by the class is equivalent to a method. A code section may include one or more other code sections in addition to other instructions. The inclusion is complete. Namely, a first code section that is included in a second code section is completely included in the section code section. For example, a code section that is a class includes one or more code sections that are methods.

One or more of the software libraries in the software library repositories may be a native library. The term, "native," refers to the code being architecture specific. A native library is a library written for a particular computer hardware architecture. As such, a native library is platform specific. The source code version of the native library may be in a low level language, such as C or C++. The source code version of the native library may be available as open source software (OSS). The compiled version of a native library is a native binary. For example, the native binary may be compiled into assembly language.

The native binary may be incorporated into other software libraries. For example, other libraries in the software library repositories (102) may use the native binary to perform certain functions. The incorporation of the native binaries into other software libraries may be performed for performance during execution. The native binaries that are incorporated into a software library may not be prominently exposed to developers of target software incorporating the software library.

Vulnerable record repositor(ies) (104) are one or more storage repositories having vulnerability records. A vulnerability record is a record of a vulnerability that is reported as being present in a software component. For example, a vulnerability repository may be in accordance with Common Vulnerabilities and Exposures (CVE) system. CVE is an established system for publicly disclosing vulnerabilities in software products (e.g., applications or libraries). CVE is used by the US National Vulnerability Database (NVD). CVE sets forth a process of uniquely identifying vulnerability and disclosing the vulnerability publicly, usually after the vulnerability is fixed. The disclosure or reporting of the vulnerability includes a standard set of metadata, such as severity. The vulnerability record may be cloned by other public and commercial providers of vulnerability databases, e.g., Github Security Advisories (GHSA). A vulnerability record may include various types of information. For example, the vulnerability record may include the unique identifier, a description of the vulnerability, one or more links to references, and other metadata.

Patches to mitigate or even correct vulnerabilities may be published in one or more code repositor(ies). A patch is a set of instructions that update a software component. A set of patches may be associated with a same vulnerability. For example, different versions of a software component may have different patches. Further, a patch may be a commit, which is an individual, addressable change to the software component. Multiple commits may exist, which are each applicable to the same software component. Thus, a set of patches may include one or more patches. Because which native binaries are included in a software library may be unknown to the vendor of target software, the vulnerabilities in the target software due to the native binaries may be unknown. Thus, even when patches may be available, a challenge exists deploying the patches to the target software.

Continuing with FIG. 1, a fingerprint repository (110) stores fingerprint records (116). A fingerprint record (116) is a record that relates a fingerprint to an identifier (120). A fingerprint (116) is generated from a compiled version of a library that is an identification of the library. Each fingerprint (118) may be a set of one or more vector embeddings that together uniquely identify the code. A vector embedding is a ordered set of numbers that encodes the meaning of at least a portion of a compiled code section of the library. Namely, the vector embedding is not computer executable, either directly or by an interpreter to cause a computing system to performing the operations of a library. Rather, a vector embedding is machine learning model encoding of the compiled code. In one or more embodiments, semantically similar portions of compiled code may have similar vector embeddings, while portions of compiled code that are dissimilar have different vector embeddings. The identifier (120) may be a common name or other such identifier of the library. In one or more embodiments, the identifier (120) may be an identifier used in the software library repositor (ies) (102) and/or the vulnerable record repositor(ies) (104).

Figure 2:
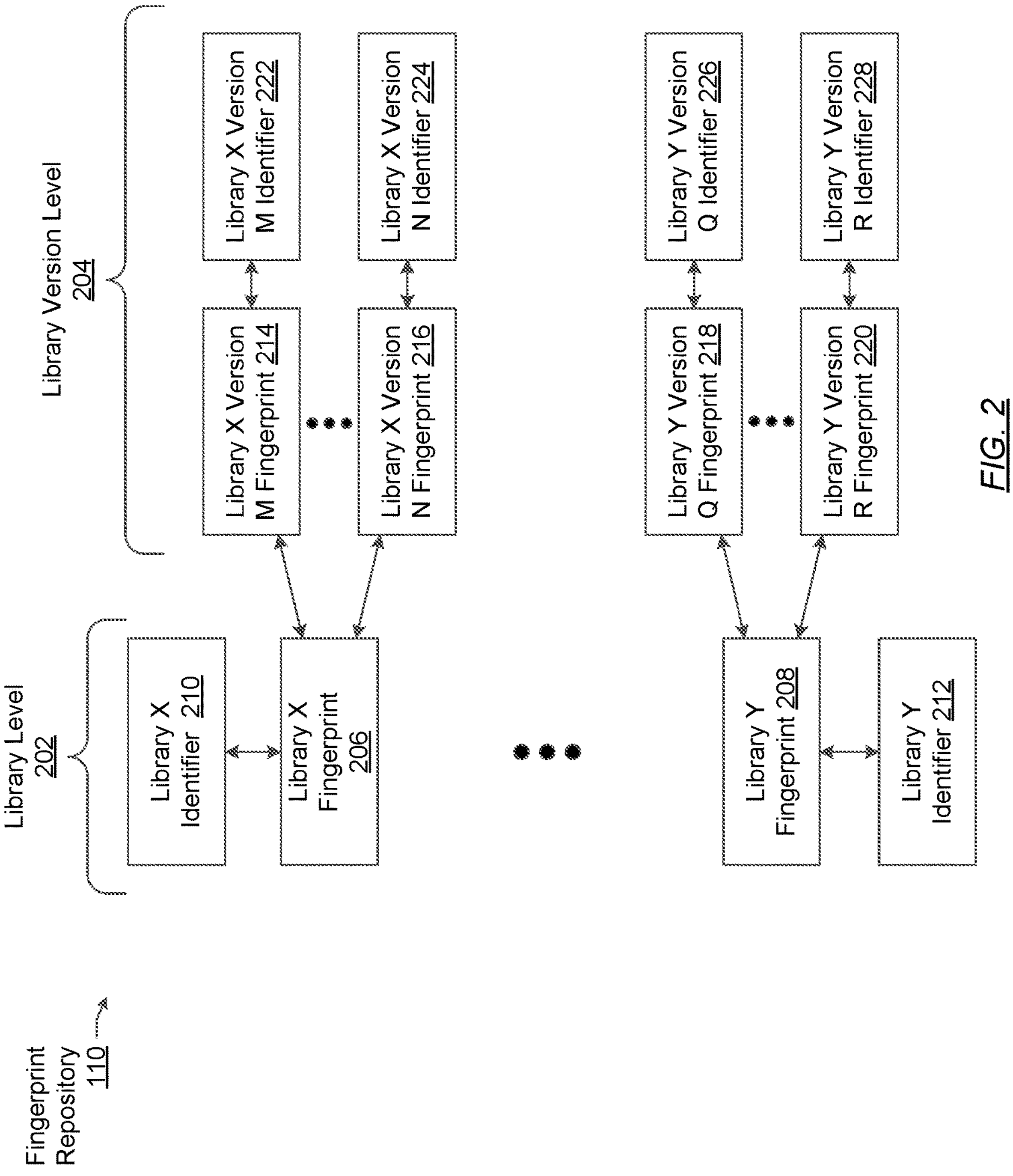
FIG. 2 shows a diagram of a fingerprint repository in accordance with one or more embodiments.

FIG. 2 shows a diagram of the fingerprint repository (110) in accordance with one or more embodiments. As shown in FIG. 2, the fingerprint repository (110) may have fingerprints at multiple levels of granularity. For example, the first level of granularity may be a library level (202) and the second level is the library version level (204). The library level has, individually for each library, a library fingerprint related to the library identifier in storage of the fingerprint repository (110). For example, the library X fingerprint (206) may be related to the library X identifier (210) and the library Y fingerprint (208) may be related to the library Y identifier (212). Each fingerprint at the library level (202) spans the set of library versions that serves to identify the library as a whole regardless of a particular library version.

The library version level (204) serves as an identifier of the library version amongst the set of library versions of the library. The library version level (204) has, individually for each library version, a library version fingerprint related, in storage of the fingerprint repository (110), to the library version identifier that uniquely identifies the library version. For example, the library X version M fingerprint (214) identifies version M of library X amongst the versions of library X. Library X version M fingerprint (214) is related to library X version M identifier (222). Library X version N fingerprint (216) is related to library X version N identifier (224). Library Y version Q fingerprint (218) is related to library Y version Q identifier (226). Library Y version R fingerprint (220) is related to library Y version R identifier (228).

Returning to FIG. 1, target software (114) is software that is a target for vulnerability analysis based on whether the target software includes one or more vulnerable libraries. Specifically, the target software (114) may include one or more software libraries, or portions thereof, from the software library repository. The inclusion may be direct (e.g., by specifying the library in the target software) or indirect (e.g., by using a library in the target software that includes a native binary). Thus, vulnerabilities in the included software libraries become, by being included in the target software, vulnerabilities in the target software.

As shown in FIG. 1, a detector program (108) may be connected to fingerprint repository (110), software library repositor(ies) (102), and vulnerable record repositor(ies) (104). The detector program (108) is configured to detect the presence of libraries in target software. The detector program (108) include a fingerprint generator (130), a reference binary selector (132), a source code parser (134), a binary disassembler (136), a normalizer (138), a vector embedding model (140), and a software manager program (112). Each of these components are described below.

The fingerprint generator (130) is configured to generate fingerprints for library and library versions. Specifically, the fingerprint generator (130) is configured to generate a library fingerprint and a library version fingerprint.

The reference binary selector (132) is software that is configured to select a reference binary for a library. The reference binary is a version of the library from which the library fingerprint is generated. Namely, the reference binary is a compiled version of the library that is selected as being representative of the library.

The source code parser (134) is software that is configured to parse source code. In one or more embodiments, the source code parser (134) may further be configured to determine the compiler agnostic portion of source code. A compiler agnostic portion of source code is a portion of source code that is not dependent on the compiler. For example, the compiler agnostic portion may be the header, license information, and other such information that is in the compiled version, but is independent of the compiler.

The binary disassembler (136) is a program that is configured to disassemble a binary and create a control flow graph for the binary. The control flow graph of a binary is a graph that indicates how code blocks of the binary are connected to other code blocks of the binary. Code blocks are blocks of binary code that do not include multiple possible execution paths within the code block (e.g., no conditional statements within the code block) and do not overlap in instructions with other code blocks. An example of a binary disassembler (136) is Ghidra. However, other disassemblers, such as interactive disassembler or a custom disassembler, may be used without departing from the scope of the technology.

The normalizer (138) is configured to normalize instructions in a control flow graph and generate a normalized graph. The normalization replaces hardware specific values with placeholders representing the type of value. Specifically, the normalization may replace operands with a placeholder identifying type of operand while keeping the operator of the instruction as is. By way of an example, a specific register may be changed to "Reg" and a specific memory address may be changed to "Mem".

A vector embedding model (140) is a machine learning model that is to transform execution traces into a vector embedding. In one or more embodiments, the vector embedding model may be pretrained for programming languages and then subsequently trained, such as by using the technique described in FIG. 7, for binary code. Notably, programming languages are written at high-level and are closer to natural language. Code written in such programming languages generally use function names and variable names for ease of understanding by a human. In contrast, the operations of binary languages have a limited instruction set that is recognized by hardware. While individual operators may be recognizable, assembly language instructions are not human readable as to be easily discernable as to what the overall execution trace is performing. Thus, a generally trained vector embedding model may be further trained as described herein to transform the binary code of an execution trace into a vector embedding.

A software manager program (112) is a software program that is configured to analyze the target software (114) and identify libraries included in the target software (114). In one or more embodiments, the software manager program (112) identifies the native binaries in the target software (114). The software manager program (112) may be further configured to fix or update the target software (114) based on the vulnerable code sections.

Figure 3:
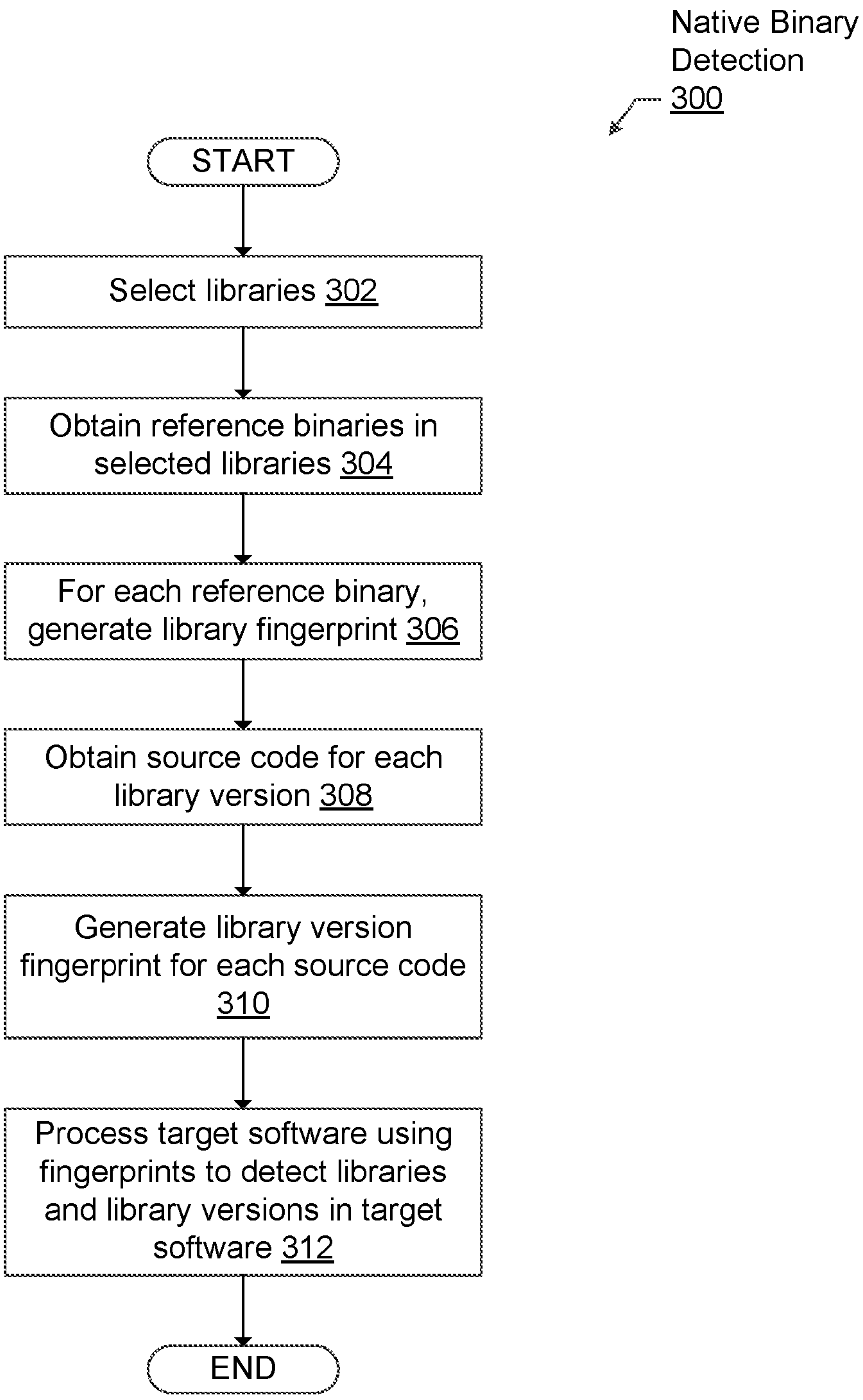
FIG. 3 shows a flowchart for native binary detection in accordance with one or more embodiments.
Figure 4:
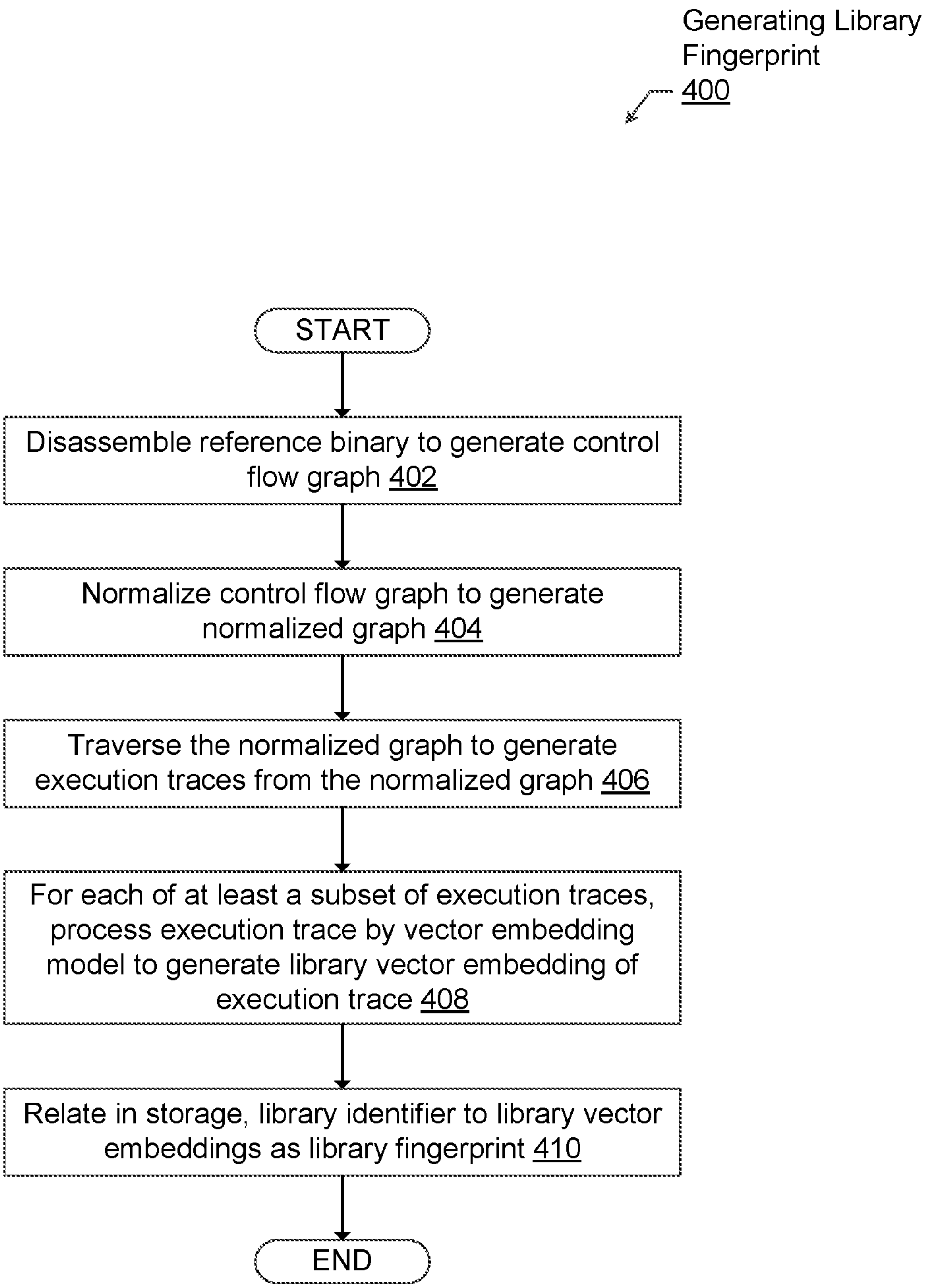
FIG. 4 shows a flowchart for generating a library fingerprint in accordance with one or more embodiments.
Figure 5:
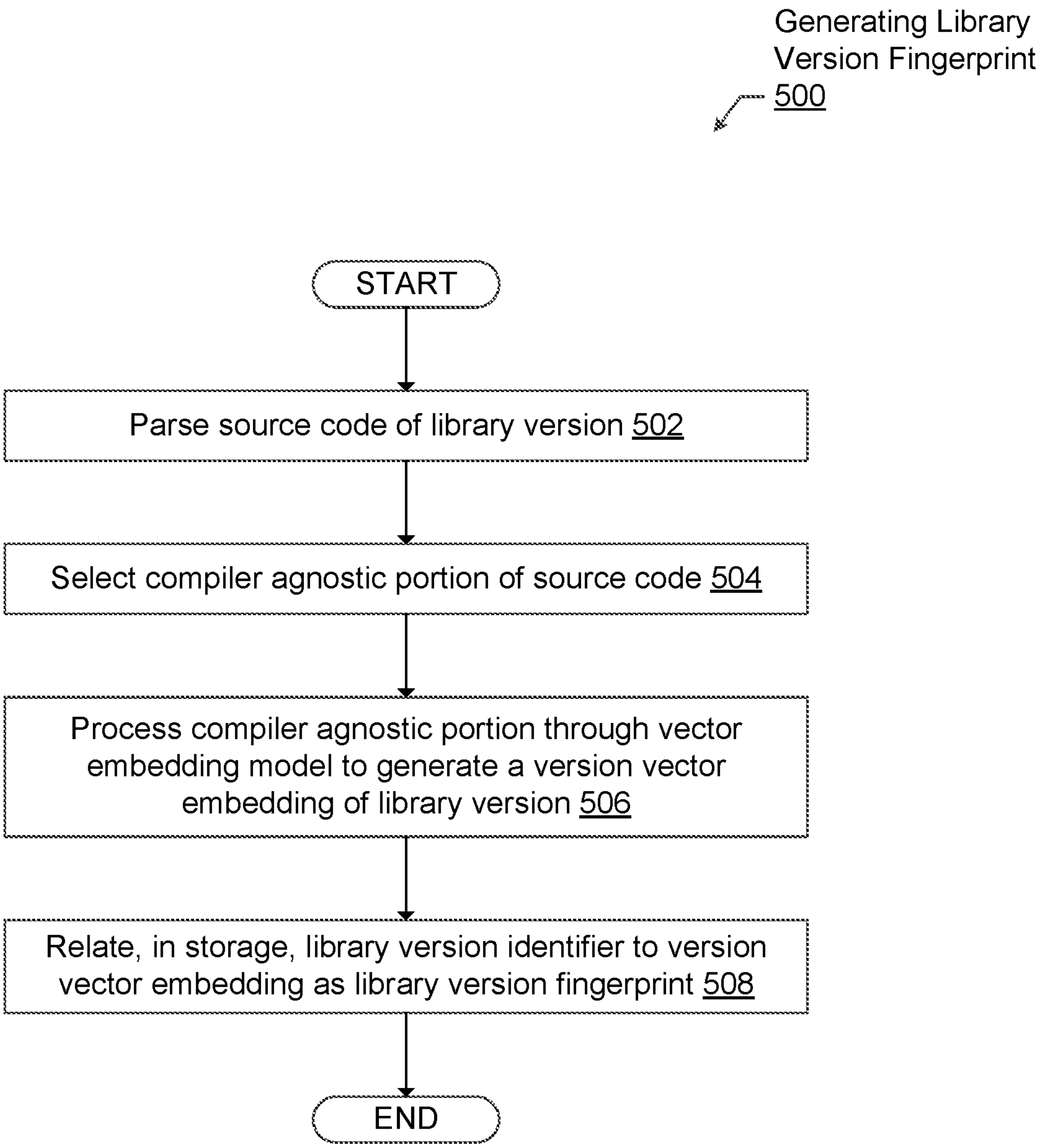
FIG. 5 shows a flowchart for generating a library version fingerprint in accordance with one or more embodiments.
Figure 6:
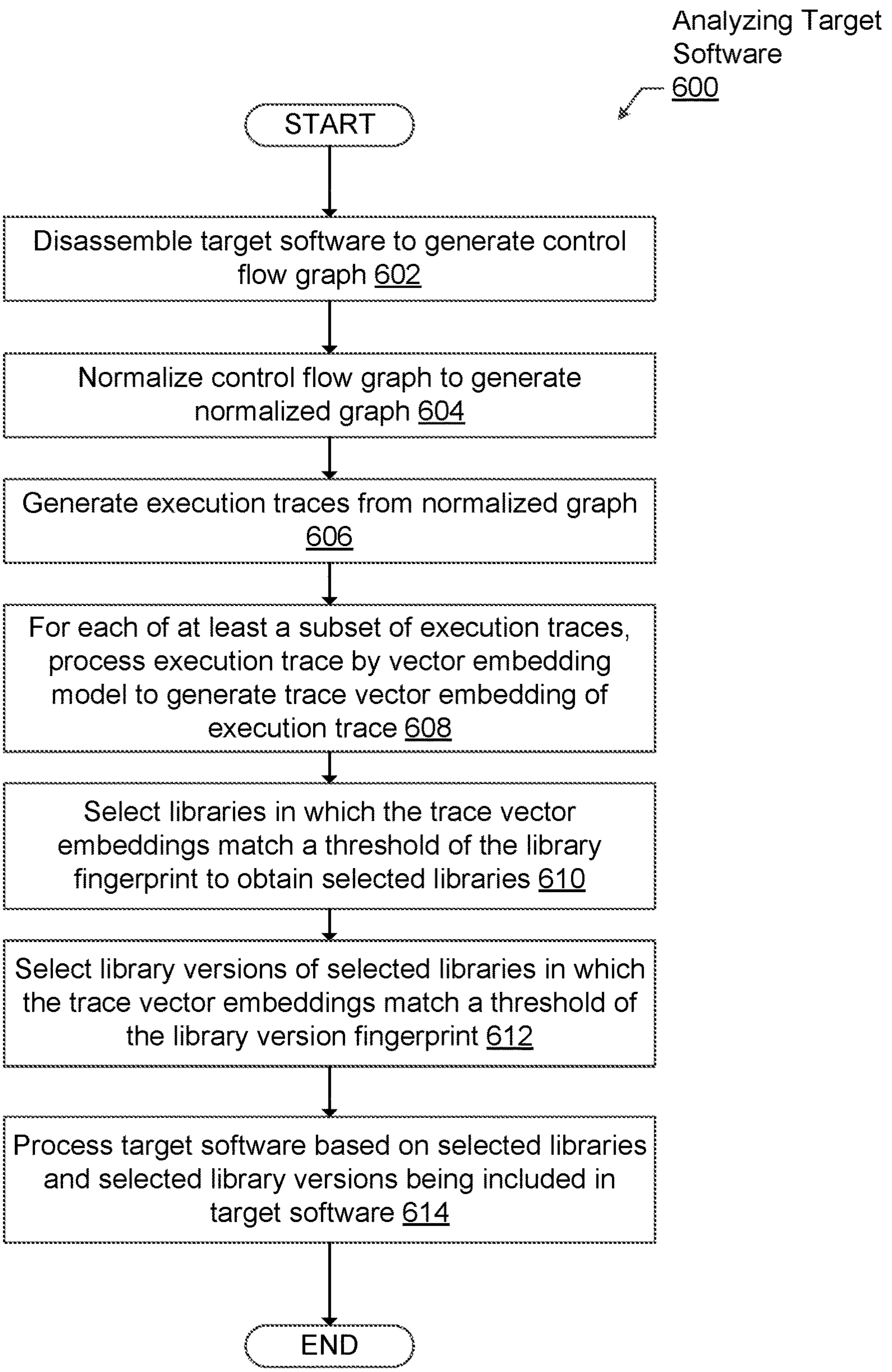
FIG. 6 shows a flowchart for analyzing target software in accordance with one or more embodiments.
Figure 7:
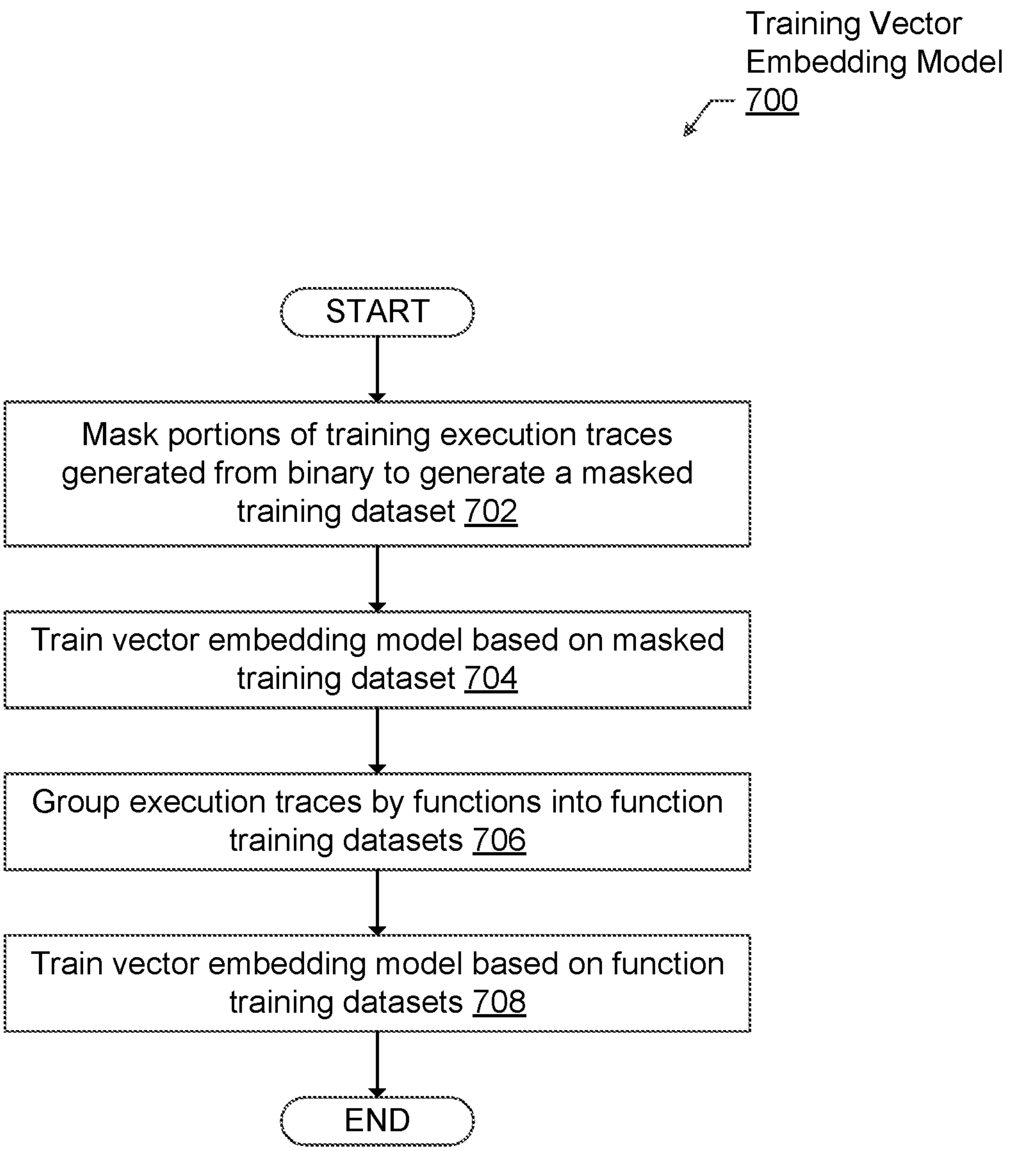
FIG. 7 shows a flowchart for training a vector embedding model in accordance with one or more embodiments.

FIGS. 3-7 show flowcharts in accordance with one or more embodiments. While the various steps in these flowcharts are presented and described sequentially, at least some of the steps may be executed in different orders, may be combined or omitted, and at least some of the steps may be executed in parallel. Furthermore, the steps may be performed actively or passively. FIG. 3 shows a flowchart of an overall process in accordance with one or more embodiments. FIGS. 4-6 show examples of techniques for performing a corresponding block of FIG. 3 in accordance with one or more embodiments. FIG. 7 shows a flowchart for training a vector embedding model in accordance with one or more embodiments.

FIG. 3 shows a flowchart for native binary detection (300) in accordance with one or more embodiments. In Block 302, libraries are selected. A large number of libraries exist. For example, JAVA has at least seven million libraries and Javascript has at least fourteen million libraries. Similarly, C and C++ also have a large number of libraries. Libraries may be selected based on being in a same software library repository, based on usage information, based on other criteria. Selection may be through iterating through one or more vulnerable record repositories using the criteria.

In Block 304, reference binaries in the selected libraries are obtained in accordance with one or more embodiments. The selected libraries may published binaries for the libraries. As another example, source code, if available, may be compiled into a binary. Each binary is for a particular version of the library. Distinct versions may exist for different architectures and/or as modified over time. One of the binaries is selected as a reference binary. In some embodiments, the reference binary may be selected, for example, based on being a most recent version of the library, a number of changes as compared to other versions, or based on other criteria.

In Block 306, for each reference binary, a library fingerprint is generated. Generally, the library fingerprint is generated by obtaining an execution trace of the library and processing the execution trace through the vector embedding model to generate a vector embedding. The vector embedding is then linked to the library identifier as one of the set of vector embeddings in the fingerprint. A technique for generating a library fingerprint is described in FIG. 4. The process of FIG. 4 is repeated for each reference binary to obtain a fingerprint for the library In Block 308, source code for each library version is obtained in one or more embodiments. For selected libraries that are open source or otherwise have source code available, library versions are selected. For resource management, only a subset of the library versions may be selected. For example, the subset may be the library versions created within a threshold amount of time from a current time. Other criteria may be used to select the library version. For each selected library version, the source code for the library version is obtained.

In Block 310, a library version fingerprint is generated for each source code in one or more embodiments. Generating the library version fingerprint for a particular library is described in FIG. 5. The process of FIG. 5 may be performed for each library version. Generally, generating the library version fingerprint is performed by generating a set of version vector embeddings from the library version. The version vector embeddings are stored as a version fingerprint performed using compiler agnostic portions of the library version. Thus, the vector embeddings are independent of the compiler used to create the library version.

In Block 312, target software is processed using fingerprints to detect libraries and library versions in the target software. The system analyzes target software. The target software may be another library or an application. Analyzing the target software is presented in FIG. 6. In general, execution traces are generated from the target software. A library is detected as being present in the target software based on a comparison of the execution traces with the library fingerprint and the library version fingerprint. Specifically, inclusion of the library or library version is determined based on a number of execution traces of the library or library version being in the set of execution traces for the target software. Because the target software likely performs other operations besides in the library, only a small portion of the fingerprints of the target software may overlap with the library. However, even in such cases, the library may be detected.

In one or more embodiments, when the set of libraries and possibly library versions that are included in the target software are determined, the vulnerability record repository may be queried with the set of libraries and library versions to obtain vulnerability records. The vulnerability records may link to patches that correct the vulnerability. The patches may be applied to the target software. For example, the target software may be updated to reference a newer version of the library.

FIG. 4 shows a flowchart for generating a library fingerprint (400) in accordance with one or more embodiments. In Block 402, a reference binary is disassembled. In one or more embodiments, the reference binary is processed by a binary disassembler. The result is a control flow graph.

In one or more embodiments, a separate control flow graph is generated for each code section. For example, each compilation unit or function or method may have an individual control flow graph generated for the compilation unit. In such a scenario, the process described below is repeated for each control flow graph and the vector embeddings generated therefrom are added to the set of library fingerprints.

In Block 404, the control flow graph is normalized to generate a normalized graph. Normalizing the control flow graph iterates through the instructions to replace architecture specific terms with a placeholder representing a type of term. The normalization process thus removes architecture specific language to transform the control flow graph to architecture independent. Thus, even though the reference binary may be architecture specific, the library fingerprint for the library may be architecture independent. Performing the normalization may be based on a mapping structure. The mapping structure maps tokens or portions of tokens to the placeholder for the token. Specifically, the instructions in the control flow graph are parsed to generate tokens, and each token that has a mapping in the mapping structure may be replaced with the placeholder mapped to the token. For example, the mapping structure may indicate that any token starting with REG should be replaced with REG for register. Thus, REG1 is replaced with REG. Similarly, the mapping structure may map tokens satisfying a regular expression should with a corresponding placeholder. For example, a token satisfying a regular expression for memory address may be replaced with MEM for memory. In one or more embodiments, the analysis is performed on the operands of the instructions. In some embodiments, both the operands and the operators of the instructions are replaced.

In Block 406, the normalized graph is traversed to generate execution traces from the normalized graph. Each execution trace follows a path through the control flow graph starting from the starting node of the normalized graph to an ending node of the normalized graph. Thus, the path is a possible flow of execution through a portion of the library. Execution traces may be overlapping, and may optionally start at a same starting node and ending at a same or different ending node. Depth first search traversal starting at the starting node may be performed to traverse the normalized graph. When a conditional expression is identified in which the current node has two or more children, the current execution trace may be cloned for each child from the current node. The two clones continue to follow respective child node. When a node of the normalized graph is visited during traversal, the instructions in the node are added to the execution trace. The result of traversing the normalized graph is a set of execution traces that track the possible paths through the representative binary.

Although FIG. 4 shows normalizing the control flow graph and then generating the execution traces from the normalized graph, it is equivalent to generate execution traces from the control flow graph and then normalize the execution traces. Because the same instructions may be normalized multiple times using the equivalent technique, more processing may be performed with the equivalent technique. The end result is the same. As such, the process shown in FIG. 4 and the claims includes both the normalizing before or normalizing after generating execution traces.

In Block 408, for each of at least a subset of execution traces, the execution trace is processed by a vector embedding model to generate a library vector embedding of the execution trace. The library vector embedding is a vector embedding that is part of the library fingerprint. The vector embedding model processes each token of the execution traces in order to encode the execution traces. Execution traces that are semantically similar have vector embeddings that are close in cosine similarity and execution traces that are semantically different have vector embeddings that are different in cosine similarity.

When generating the execution traces, the library identifier is related, in storage, to the library vector embeddings as a library fingerprint in Block 410. The set of library vector embeddings form the library fingerprint for the library.

FIG. 5 shows a flowchart for generating a library version fingerprint (500) in accordance with one or more embodiments. The processing of FIG. 5 starts with a source code of a particular version of the library and generates a library fingerprint for the particular version. In Block 502, the source code of the library is parsed. Compiler agnostic portions of the source code is selected in Block 504. The compiler agnostic portions are the portions of the source code that do not change regardless of the compiler. For example, versioning information, headers, and other information that may be in the binary, but are independent of the compiler are selected. Selecting the compiler agnostic portion may be based on one or more predefined rules as to which portions are compiler agnostic.

In Block 506, the compiler agnostic portion is processed through a vector embedding model to generate a version vector embedding of the library version. The vector embedding model may be the same or different than the vector embedding model used to generate the vector embedding for the library. If the compiler agnostic portion has multiple separate portions, such as in different code sections, then a vector embedding may be generated for each separate portion.

In Block 508, the library version identifier is related in storage to the version vector embedding as the library version fingerprint. Specifically, the set of one or more version vector embeddings are linked to the library version identifier.

FIG. 6 shows a flowchart for analyzing target software (600) in accordance with one or more embodiments. In Block 602, the target software is disassembled to generate a control flow graph. In Block 604, the control flow graph is normalized to generate a normalized graph. In Block 606, execution traces are generated from the normalized graph. In Block 608, for each of at least a subset of execution traces, the execution trace is processed by the vector embedding model to generate target vector embedding of execution trace. The processing of Blocks 602-608 may be performed in a same or similar manner as discussed above with reference to Blocks 402-408 of FIG. 4. Specifically, the compiled version of the target software may undergo the same processing as the library to create a parallel set of execution traces.

For clarity of terminology, the library vector embedding is the vector embedding of the library. The version vector embedding is the vector embedding of the library version. The target vector embedding is the vector embedding of the target software.

In Block 610, libraries in which the target vector embeddings match a threshold of the library fingerprint are selected to obtain selected libraries. In one or more embodiments, the traces vector embeddings are compared to the library vector embeddings to identify matching vector embeddings. In one or more embodiments, matching is an exact match (e.g., identical vector embeddings). In other embodiments, matching is based on a distance threshold on cosine distance. Namely, cosine distance between the library vector embedding and the target vector embedding may be calculated. If the cosine distance satisfies the distance threshold, then the library vector embedding is determined to match the target vector embedding.

The libraries having more than a threshold number or a threshold percentage of library vector embeddings that match the target vector embeddings are selected. The threshold may be, for example, eighty percent of the set of library vector embeddings. However, other thresholds may be used without departing from the scope of the invention.

In Block 612, library versions of selected libraries in which the target vector embeddings match a threshold of the library version fingerprint are selected. In one or more embodiments, for each selected library in Block 610, the library version fingerprints of the library versions of the library are obtained. A same or similar process as described above with reference to Block 610 is performed. In one or more embodiments, the traces vector embeddings are compared to the library vector embeddings to identify matching vector embeddings and a determination is made whether the matching vector embeddings satisfies the threshold.

In Block 614, the target software is processed based on selected libraries and selected library versions being included in target software. Processing the target software may be performed as described above with reference to Block 312 of FIG. 3.

FIG. 7 shows a flowchart for training a vector embedding model (700) in accordance with one or more embodiments. The process of training the vector embedding model may start with a pretrained model. The pretrained model may be pretrained on source code in a high level programming language. The process of FIG. 7 further trains the vector embedding model for compiled code, such as binary code. For example, the process of FIG. 7 may be performed to further train the vector embedding model on assembly language.

In Block 702, portions of training execution traces generated from binary to generate a masked training dataset.

The training execution traces may be execution traces from a subset of the libraries that are normalized. One or more tokens in each of the training execution traces are masked, or hidden. The vector embedding model is then trained based on the masked training dataset in Block 704. Training the vector embedding model may be based on sentence completion training. In sentence completion training, the vector embedding model is trained to complete the rest of a sentence based on the first part of the sentence. In the present case, the sentence is the training execution trace. The completion of the sentence is the masked portion of the training execution trace. The vector embedding is the last hidden state of the vector embedding model. Thus, by performing sentence completion training, the vector embedding model is trained to output, as a final hidden state, a similar vector embedding for correct prediction of masked portions and dissimilar vector embeddings for incorrect prediction of masked portions.

In Block 706, the execution traces are grouped by functions into function training data sets. Each function is a code section. In Block 708, the vector embedding model is trained based on the function training dataset. The training of the vector embedding model in Block 708 is based on next sentence prediction. In next sentence prediction, the vector embedding model outputs a positive value when a sentence is predicted as being the next sentence and false otherwise. In the present case, given two execution traces from the same function, the training causes the vector embedding model to predict true indicating the same function and false otherwise. As discussed above, the final hidden state of the vector embedding model is the vector embedding of the execution trace.

The process of FIG. 7 transforms a generic vector embedding model for code to a specific vector embedding model that generates execution traces from code that is not easily readable by a human.

Figure 8A:
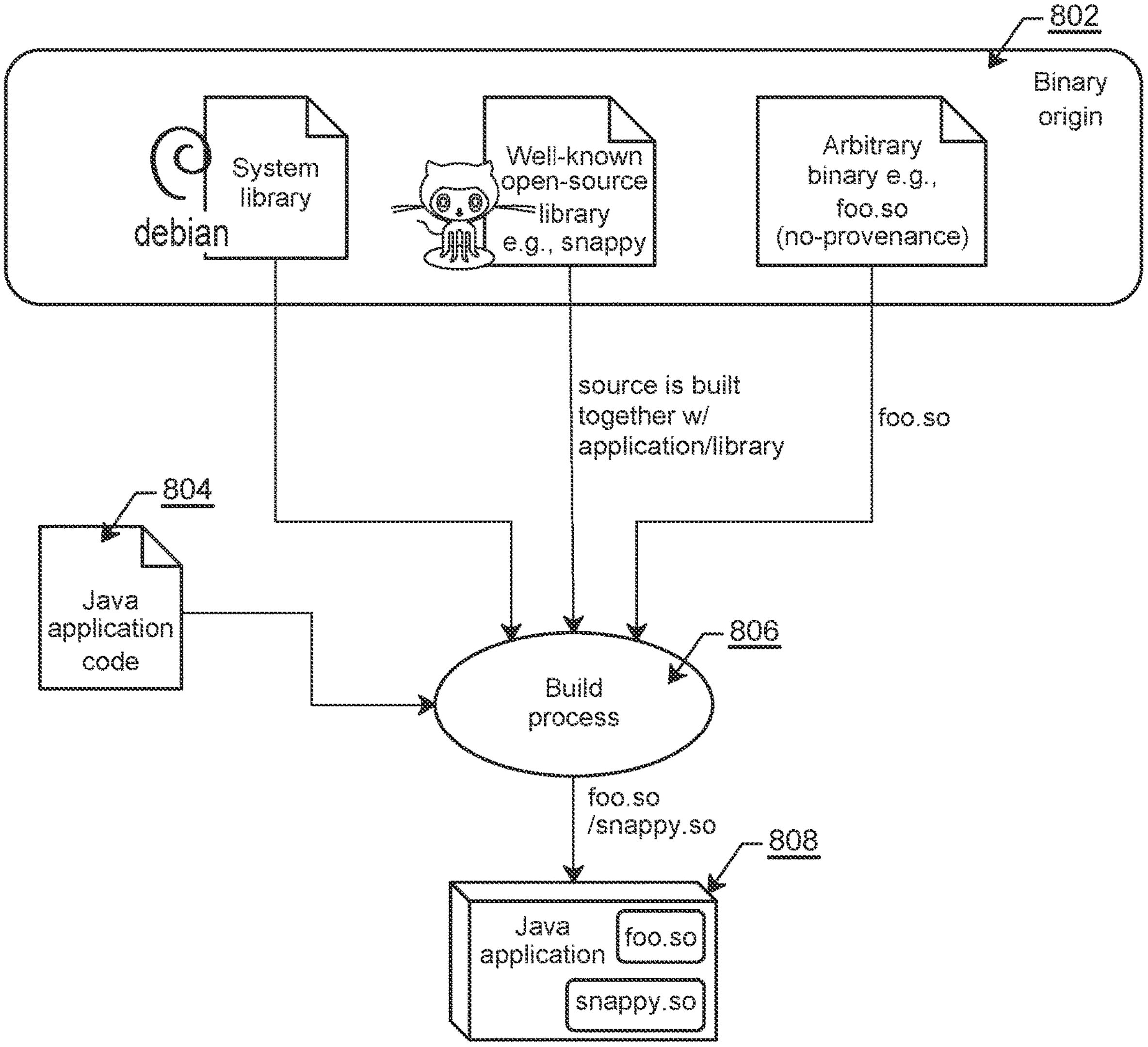
FIG. 8A and FIG. 8B shows an example in accordance with one or more embodiments.
Figure 8B:
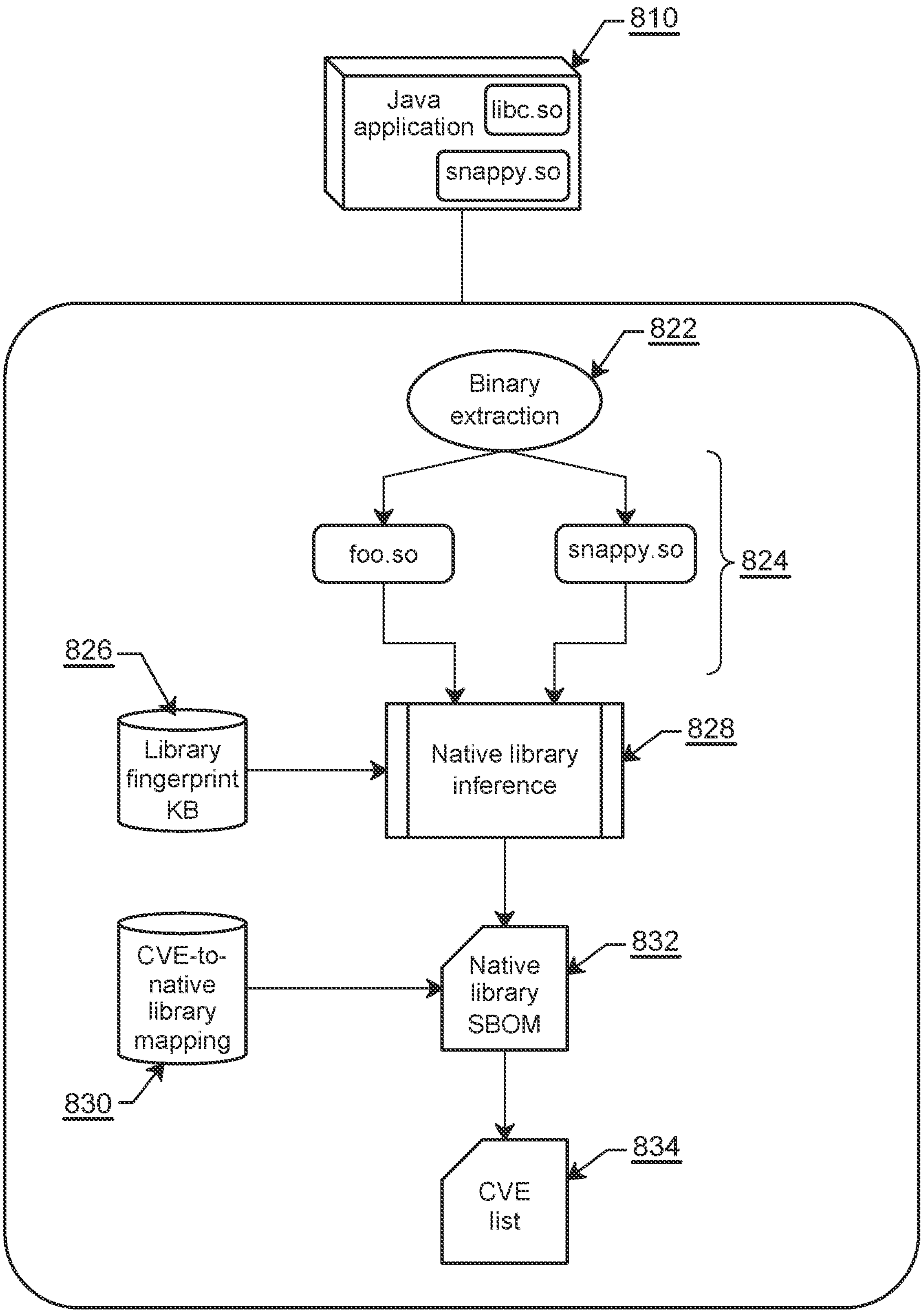

FIG. 8A and FIG. 8B shows an example in accordance with one or more embodiments.

Turning to FIG. 8A, many different origins of binary libraries exist (802). For example, binaries may be compiled from a source, well-known libraries, and other arbitrary libraries. For example, arbitrary libraries may be downloaded from non-open source software library repositories.

Libraries may be referenced by application code (804). For example, the application code may include a link to a library for backward compatibility. The application code may include references to multiple libraries. During the build process, the application code is compiled and binary of the libraries are added to create a target application (808). Thus, as part of the target application (808), binary libraries such as foo.so and snappy.so are included. However, which libraries that foo.so and snappy.so correspond to may be unknown.

FIG. 8B is an example diagram for analyzing the target application (810). In one or more embodiments, binary extraction is (822) is performed on the target application (810) to obtain the binary files (e.g., .so files) in the compiled application. From the binary files, native library inference (828) is performed by comparing target vector embeddings to library fingerprints of different libraries in the library fingerprint repository (826). The result is an identification of the native library's SBOM (832). The vulnerability record repository (labeled CVE-to-native library mapping (830)) is searched with the identified libraries to obtain a vulnerability list of vulnerabilities. Thus, the target software may be updated based on identified vulnerabilities.

Figure 9:
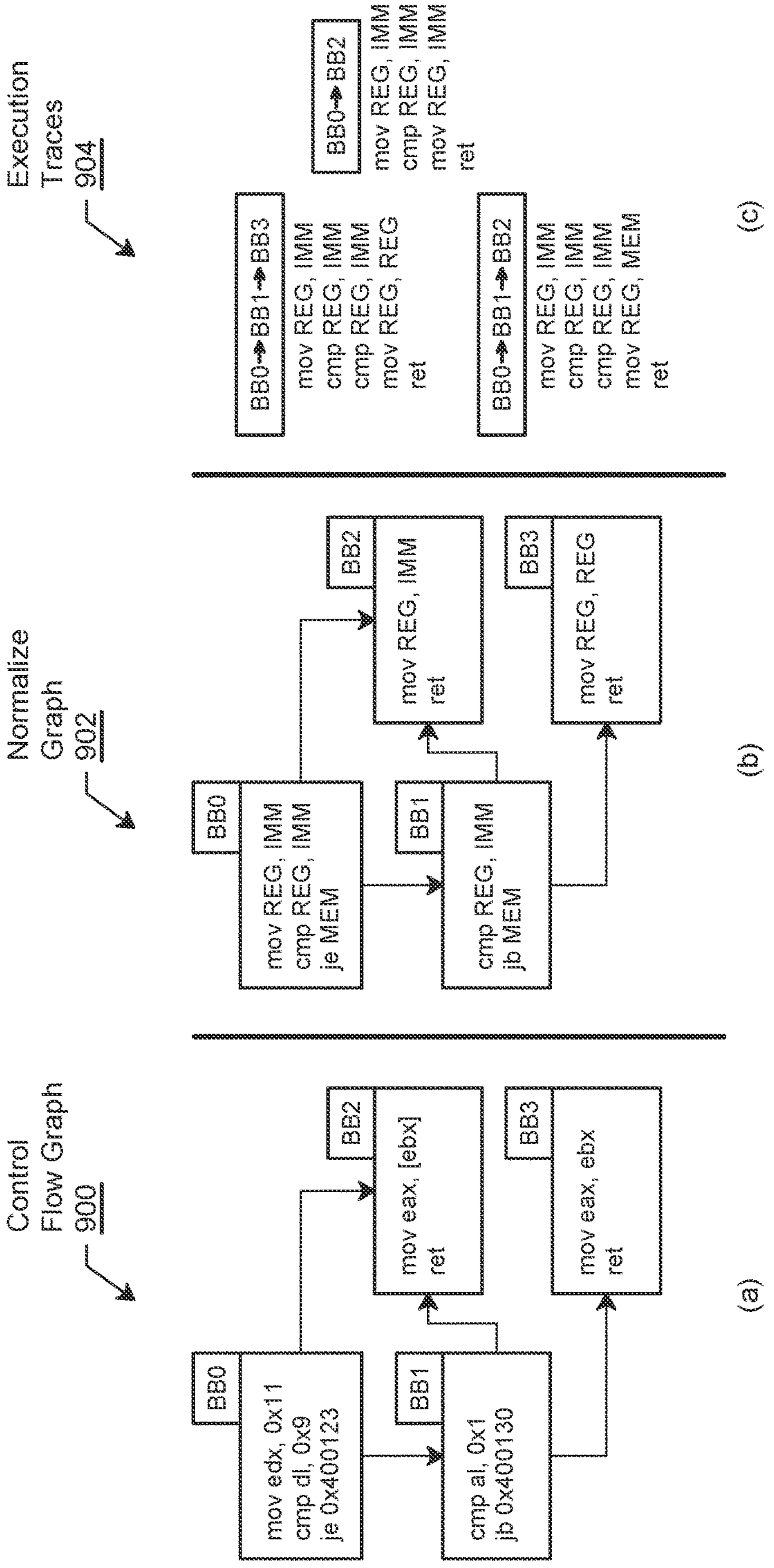
FIG. 9 shows an example for generating a library fingerprint in accordance with one or more embodiments.

FIG. 9 shows an example for generating a library fingerprint in accordance with one or more embodiments. Specifically, FIG. 9 shows a simplified example of generating a library fingerprint. A control flow graph (900) is generated by disassembling the library binary. The control flow graph (900) shows the control flow on the assembly language instructions. The control flow graph is normalized to generate a normalized graph (902). Specifically, the specific register names are replaced with the placeholder REG, and the specific memory addresses are replaced with MEM. The normalized graph (902) is traversed to generate execution traces (904). Each execution trace represents a possible execution flow through the library binary. Thus, the vector embeddings generated from execution traces form a fingerprint for the library.

Figure 10A:
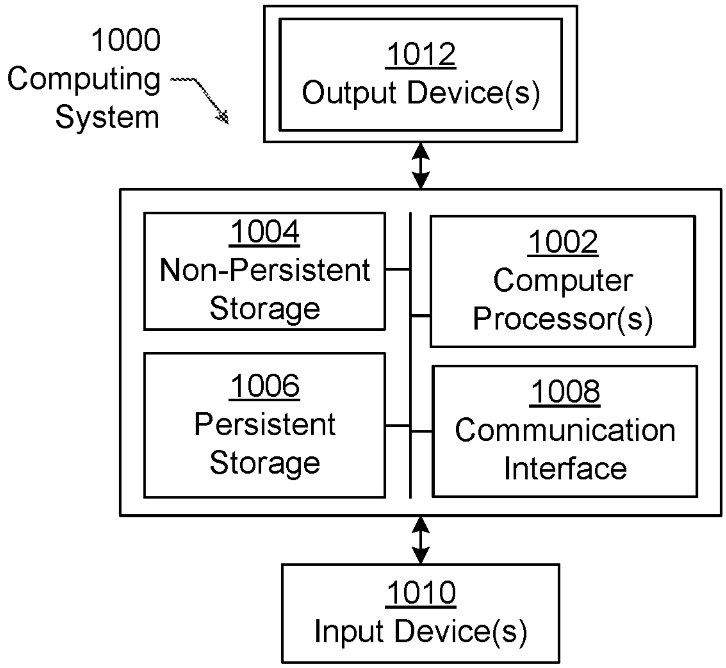
FIG. 10A and FIG. 10B shows a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 10A, the computing system (1000) may include one or more computer processors (1002), non-persistent storage (1004), persistent storage (1006), a communication interface (1008) (e.g., Bluetooth interface, infrared interface, network interface, optical interface, etc.), and numerous other elements and functionalities that implement the features and elements of the disclosure. The computer processor(s) (1002) may be an integrated circuit for processing instructions. The computer processor(s) may be one or more cores or micro-cores of a processor. The computer processor(s) (1002) includes one or more processors. The one or more processors may include a central processing unit (CPU), a graphics processing unit (GPU), a tensor processing units (TPU), combinations thereof, etc.

The input devices (1010) may include a touchscreen, keyboard, mouse, microphone, touchpad, electronic pen, or any other type of input device. The input devices (1010) may receive inputs from a user that are responsive to data and messages presented by the output devices (1012). The inputs may include text input, audio input, video input, etc., which may be processed and transmitted by the computing system (1000) in accordance with the disclosure. The communication interface (1008) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the output devices (1012) may include a display device, a printer, external storage, or any other output device. One or more of the output devices may be the same or different from the input device(s). The input and output device(s) may be locally or remotely connected to the computer processor(s) (1002). Many different types of computing systems exist, and the aforementioned input and output device(s) may take other forms. The output devices (1012) may display data and messages that are transmitted and received by the computing system (1000). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 10B:
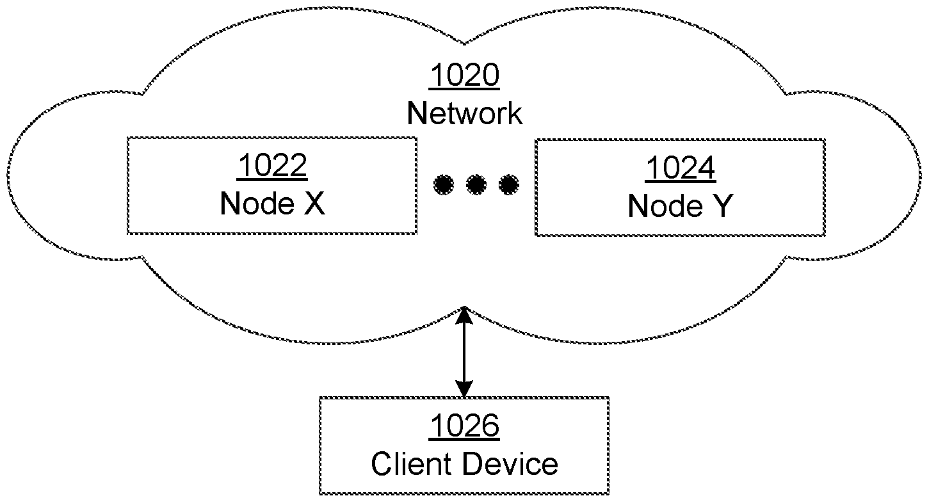

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

The nodes (e.g., node X (1022), node Y (1024)) in the network (1020) may be configured to provide services for a client device (1026), including receiving requests and transmitting responses to the client device (1026). For example, the nodes may be part of a cloud computing system. The client device (1026) may be a computing system, such as the computing system shown in FIG. 10A. Further, the client device (1026) may include and/or perform all or a portion of one or more embodiments.

The computing system of FIG. 10A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

disassembling a reference binary of a library to generate a first control flow graph of the reference binary;

normalizing the first control flow graph by replacing a plurality of hardware specific operands in instructions with a corresponding operand type placeholder representing a type of operand while maintaining a corresponding operator in the first control flow graph, wherein normalizing the first control flow graph generates a first normalized graph;

traversing the first normalized graph to generate a first plurality of execution traces, each execution trace of the first plurality of execution traces following a path of nodes in depth first search order in from the first normalized graph, wherein each node includes at least one token;

generating a plurality of library vector embeddings by, for each execution trace of at least a subset of the first plurality of execution traces, processing each token in the path of nodes in order by a vector embedding model to generate a library vector embedding of the execution trace; and relating, in storage, a library identifier of the library to the plurality of library vector embeddings as a multi-vector fingerprint of the library representing a plurality of execution paths of the library.

2. The method of claim 1, further comprising:

disassembling target software to generate a second control flow graph of the target software;

normalizing the second control flow graph to generate a second normalized graph;

traversing the second normalized graph to generate a second plurality of execution traces from the second normalized graph;

generating a plurality of target vector embeddings by processing the second plurality of the execution traces by the vector embedding model; and selecting the library as being in the target software when the plurality of target vector embeddings matching the plurality of library vector embeddings satisfy a threshold.

3. The method of claim 1, further comprising:

obtaining source code for each library version of a plurality of library versions of the library;

generating a plurality of library version fingerprints from the source code for each library version of the plurality of library versions; and processing target software using the plurality of library version fingerprints to detect a library version of the library in the target software.

4. The method of claim 3, wherein generating the plurality of library version fingerprints comprises, for the library version:

parsing the source code of the library version to obtain parsed source code;

selecting a compiler agnostic portion of the source code;

processing the compiler agnostic portion through the vector embedding model to generate a version vector embedding of the library version; and relating, in storage, a library version identifier of the library version with the version vector embedding of the library version.

5. The method of claim 1, further comprising:

masking a portion of a training execution trace generated from a training binary of a training library to obtain a masked training execution trace having a masked portion; and training the vector embedding model using the training binary to predict the masked portion.

6. The method of claim 1, further comprising:

grouping a plurality of training execution traces by function to obtain a function training dataset; and training the vector embedding model using the function training dataset.

7. The method of claim 6, wherein training the vector embedding model comprises:

training the vector embedding model to predict whether at least two of the training execution traces are members of a same function training dataset.

8. A system comprising:

storage; and a computer processor comprising computer readable program code for causing a computing system to perform operations comprising:

disassembling a reference binary of a library to generate a first control flow graph of the reference binary, normalizing the first control flow graph by replacing a plurality of hardware specific operands in instructions with a corresponding operand type placeholder representing a type of operand while maintaining a corresponding operator in the first control flow graph, wherein normalizing the first control flow graph generates a first normalized graph, traversing the first normalized graph to generate a first plurality of execution traces, each execution trace of the first plurality of execution traces following a path of nodes in depth first search order in the first normalized graph, wherein each node includes at least one token, generating a plurality of library vector embeddings by, for each execution trace of at least a subset of the first plurality of execution traces, processing each token in the path of nodes in order by a vector embedding model to generate a library vector embedding of the execution trace, and relating, in storage, a library identifier of the library to the plurality of library vector embeddings as a multi-vector fingerprint of the library representing a plurality of execution paths of the library.

9. The system of claim 8, wherein the operations further comprise:

disassembling target software to generate a second control flow graph of the target software;

normalizing the second control flow graph to generate a second normalized graph;

traversing the second normalized graph to generate a second plurality of execution traces from the second normalized graph;

generating a plurality of target vector embeddings by processing the second plurality of the execution traces by the vector embedding model; and selecting the library as being in the target software when the plurality of target vector embeddings matching the plurality of library vector embeddings satisfy a threshold.

10. The system of claim 8, wherein the operations further comprise:

obtaining source code for each library version of a plurality of library versions of the library;

generating a plurality of library version fingerprints from the source code for each library version of the plurality of library versions; and processing target software using the plurality of library version fingerprints to detect a library version of the library in the target software.

11. The system of claim 10, wherein generating the plurality of library version fingerprints comprises, for the library version:

parsing the source code of the library version to obtain parsed source code;

selecting a compiler agnostic portion of the source code;

processing the compiler agnostic portion through the vector embedding model to generate a version vector embedding of the library version; and relating, in storage a library version identifier of the library version with the version vector embedding of the library version.

12. The system of claim 8, wherein the operations further comprise:

masking a portion of a training execution trace generated from a training binary of a training library to obtain a masked training execution trace having a masked portion; and training the vector embedding model using the training binary to predict the masked portion.

13. The system of claim 8, wherein the operations further comprise:

grouping a plurality of training execution traces by function to obtain a function training dataset; and training the vector embedding model using the function training dataset.

14. The system of claim 13, wherein training the vector embedding model comprises:

training the vector embedding model to predict whether at least two of the training execution traces are members of a same function training dataset.

15. A method comprising:

disassembling target software to generate a control flow graph;

normalizing the control flow graph by replacing a plurality of hardware specific operands with a corresponding operand type placeholder representing a type of operand while maintaining a corresponding operator in the first control flow graph, wherein normalizing the control flow graph generates a normalized graph;

traversing the normalized graph to generate a plurality of execution traces, each execution trace of the plurality of execution traces following a path of nodes in depth first search order in the normalized graph, wherein each node includes at least one token;

processing, by a vector embedding model, each token in the path of nodes for each of the plurality of execution traces to generate a plurality of target vector embeddings of the target software;

selecting, from a plurality of libraries, a library in which the plurality of target vector embeddings matches a first threshold of a library fingerprint of the library to obtain a selected library, wherein the library fingerprint represents a plurality of execution paths of the library; and processing the target software based on the selected library.

16. The method of claim 15, further comprising:

selecting, from a plurality of library versions of the selected library, a library in which the plurality of target vector embeddings matches a second threshold of a library version fingerprint to obtain a selected library version, wherein processing the target software is further based on the selected library version.

17. The method of claim 15, wherein processing the target software comprises:

accessing a vulnerability repository with the selected library and a selected library version to detect a vulnerability in the target software; and reporting the vulnerability.

18. The method of claim 15, wherein selecting the selected library comprises:

comparing a plurality of library vector embeddings of the selected library with the plurality of target vector embeddings of the target software to determine a percentage of the plurality of library vector embeddings matching the plurality of target vector embeddings; and comparing the percentage to the first threshold to determine that the first threshold is satisfied.

19. The method of claim 15, further comprising:

obtaining source code for each library version of a plurality of library versions of the library;

generating a plurality of library version fingerprints from the source code for each library version of the plurality of library versions; and processing target software using the plurality of library version fingerprints to detect a library version of the library in the target software.

20. The method of claim 19, wherein generating the plurality of library version fingerprints comprises, for the library version:

parsing the source code of the library version to obtain parsed source code;

selecting a compiler agnostic portion of the source code;

processing the compiler agnostic portion through the vector embedding model to generate a version vector embedding of the library version; and relating, in storage a library version identifier of the library version with the version vector embedding of the library version.

* * * * *